No. 665,605. Patented Jan. 8, 1901.
J. KELLY.
TIRE.
(Application filed Feb. 14, 1900.)

(No Model.)

Witnesses
C. H. S. Austin

Inventor
James Kelly
By F. T. Brown
Attorney

THE NORRIS PETERS CO., PHOTO-LITHO., WASHINGTON, D. C.

United States Patent Office.

JAMES KELLY, OF PASSAIC, NEW JERSEY, ASSIGNOR OF TWO-THIRDS TO N. DU BOIS STRAYER AND JAMES FERGUSON, OF SAME PLACE.

TIRE.

SPECIFICATION forming part of Letters Patent No. 665,605, dated January 8, 1901.

Application filed February 14, 1900. Serial No. 5,186. (No model.)

*To all whom it may concern:*

Be it known that I, JAMES KELLY, a citizen of the United States, residing at Passaic, in the county of Passaic and State of New Jersey, have invented certain new and useful Improvements in Tires; and I do hereby declare the following to be a full, clear, and exact description of the invention, such as will enable others skilled in the art to which it appertains to make and use the same.

This invention relates to an improvement in tires for vehicles, and more particularly to that type or class of tires which are formed of rubber having a hollow interior and in which chamber are placed a series of yieldable balls.

The object of the present invention is the provision of a tire which is particularly adapted for use in connection with heavy vehicles, such as automobiles, trucks, carriages, &c. Heretofore in the construction of tires of this type the balls have either been inflated or have been securely held in position, and it has also been suggested to fill the tire with a series of objects, so that should the tire be of the pneumatic type and be punctured the weight of the vehicle would be carried by the objects contained therein. In my invention I employ a series of balls, making them conveniently and preferably solid. These balls are made to fit closely within the chamber of the tire and are so made as to move independently one of the other.

It also relates to improvements in the general structure, as presently to be described.

Figure 1:
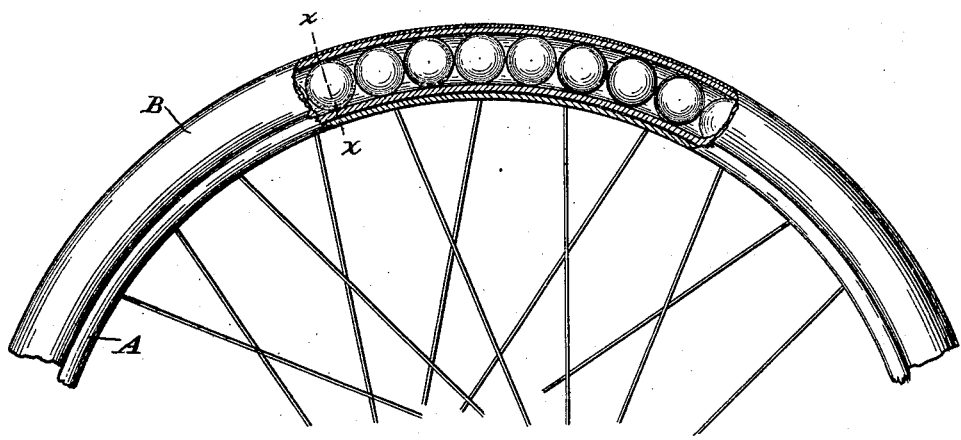
Figure 2:
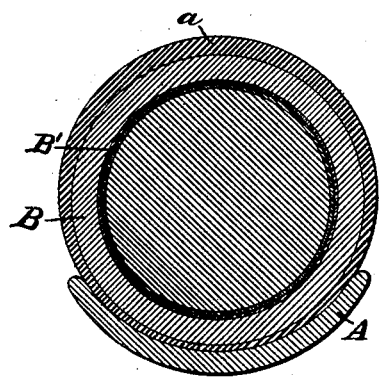

In the drawings, Figure 1 shows a view of part of a tire, portions being shown in section. Fig. 2 is a cross-section on the line $x$ $x$ of Fig. 1.

In the drawings, A represents the rim of a wheel, which may be of metal or any suitable material.

B represents a hollow flexible tire, preferably made of a series of layers of canvas and rubber vulcanized. The outer tread of the tire is somewhat thicker than the inner surface, as shown at $a$. The walls of the tire are conveniently of sufficient thickness to withstand considerable load, and in this respect are designed for what is termed largely a "cushioned" tire.

The inner walls of the tire A are coated with rubber, which rubber is coated with an antifriction material B'. This material is conveniently composed of the following ingredients: plumbago, beeswax, and vaseline or petroleum, with a sufficient amount of turpentine to moisten the mixture. The mixture, in the form of a paste, is applied to the entire inner face of the interior of the tire and forms what may properly be termed a "lubricated" or "antifriction" surface, which soon hardens. The antifriction material thus provided and applied constitutes a fixed layer for the contacting faces of the rubber balls, presently referred to, and the inner face of the tire.

C represents a series of rubber balls filling the bore of the tire. These balls are conveniently solid and are of a diameter to loosely fit the bore, so as to have a slight movement. The surface of the balls is coated with the material above referred to.

In use as the pressure is brought against the tire it has been demonstrated that there is more or less movement between the surface of the inner walls of the tire and between the balls. This constant movement has a tendency to wear the surface and largely impair the tire. By coating the surface with antifriction material this wearing is wholly avoided and the life of the tire largely increased.

While I have shown solid balls, it is to be understood that hollow balls can be used, if desired, and also that various other changes can be made without departing from the nature and principle of the invention.

Having thus described my invention, what I claim as new, and desire to secure by Letters Patent, is—

A tire for vehicles consisting of a hollow rubber tire and a series of rubber balls in the tire, the surface of the balls and the interior of the tire being composed of a fixed coating of hard antifriction material constituting a layer of material, substantially as described.

In testimony whereof I affix my signature in presence of two witnesses.

JAMES KELLY.

Witnesses:
 WILLIAM R. RYAN,
 WILLIAM P. HURLEY.